United States Patent [19]

Adachi

[11] 4,107,926
[45] Aug. 22, 1978

[54] BRAKE BOOSTER

[75] Inventor: Yoshiharu Adachi, Gamogouri, Japan

[73] Assignee: Aisin Seiki Kabushiki Kaisha, Japan

[21] Appl. No.: 688,246

[22] Filed: May 20, 1976

[30] Foreign Application Priority Data

Jun. 17, 1975 [JP] Japan .................................. 50-73504

[51] Int. Cl.² .............................................. B60T 13/12
[52] U.S. Cl. ...................................... 60/548; 60/553;
60/581; 60/593; 91/369 B; 91/411 A
[58] Field of Search ................. 60/548, 557, 547, 554,
60/581, 593, 553; 91/369 B, 411 A

[56] References Cited

U.S. PATENT DOCUMENTS

| | | | |
|---|---|---|---|
| 2,844,941 | 7/1958 | Ayers | 60/548 |
| 3,050,944 | 8/1962 | Schwartz | 60/548 |
| 3,685,289 | 8/1972 | Kobashi | 60/552 |
| 3,727,405 | 4/1973 | Randol | 91/369 B |
| 3,813,992 | 6/1974 | Brown | 91/369 B |
| 3,838,628 | 10/1974 | Kita | 91/369 B |
| 3,914,941 | 10/1975 | Gardner | 60/562 |
| 3,935,709 | 2/1976 | Mathues | 60/547 |
| 3,967,536 | 7/1976 | Bach | 60/553 |
| 3,973,401 | 8/1976 | Reynolds | 60/548 |

Primary Examiner—Irwin C. Cohen
Assistant Examiner—Abraham Hershkovitz
Attorney, Agent, or Firm—Oblon, Fisher, Spivak, McClelland & Maier

[57] ABSTRACT

A dual source power brake booster assembly includes an air-vacuum operated booster section and a hydraulic pressure operated booster section in series. The assembly is so arranged that the vacuum booster section is initially actuated to obtain a booster brake operation when the vehicle operator depresses a brake pedal, and the hydraulic booster section is actuated so as to continue the booster brake operation in response to the increased depression on the brake pedal after the vacuum booster reaches its limit or run-out condition. Both of the booster sections have power members or pistons, respectively, which are always actuated as a unit, so that a common reaction mechanism may be provided for both booster sections.

7 Claims, 1 Drawing Figure

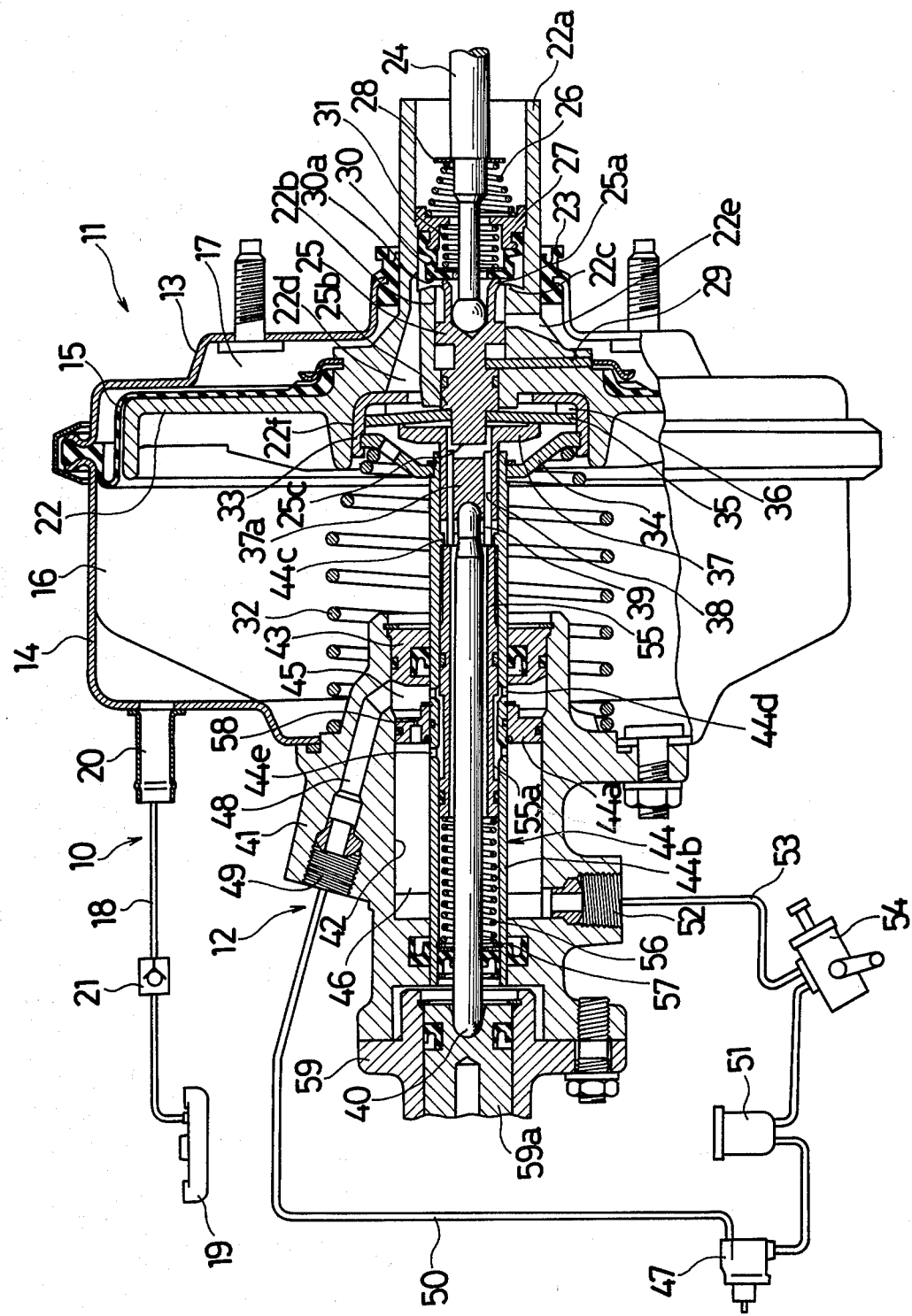

BRAKE BOOSTER

BACKGROUND OF THE INVENTION

1. Field of the Invention

This invention relates generally to a dual source power brake booster assembly, and more particularly to an assembly having, in series, an air-vacuum operated booster section and a hydraulic pressure operated booster section.

2. Description of the Prior Art

Conventionally, the booster assembly of the above-mentioned type has been proposed wherein the booster brake pressures are initially obtained by operation of the vacuum booster section without operating the hydraulic booster section, and are then obtained by operation of the hydraulic booster section after the vacuum booster section reaches its limit or run-out condition.

The above assembly is effective to reduce the consumption of vacuum, and an example of such an assembly is illustrated in U.S. Pat. No. 3,935,709. This prior art device has, however, a vacuum actuated power piston which is movable relative to the movement of a hydraulic pressure actuated power piston which is, in turn, arranged integrally with an output member of the assembly, and this arrangement requires a reaction mechanism for each of the vacuum and hydraulic booster sections.

In the above-noted prior art device, the hydraulic booster section must also be provided with a hydraulic reaction mechanism which includes differential hydraulic pressure receiving areas thereby giving the reaction force to the vehicle operator. By this construction, another fluidically actuated means, such as, for example, a power steering gear, may be arranged between a hydraulic pressurized source and the hydraulic reaction mechanism so as not to generate any hydraulic reaction force at the reaction mechanism of the hydraulic booster section when, for example, the power steering gear is actuated. However, this requires a power steering gear which can deliver at least the fluid pressure required by the hydraulic booster section so as to assure the operation of the hydraulic booster even when the power steering gear is in the operating condition.

SUMMARY OF THE INVENTION

It is, therefore, an object of the present invention to provide an improved dual source power brake booster assembly which obviates the various drawbacks mentioned hereinabove.

It is another object of the present invention to provide an improved booster assembly in which a common reaction mechanism is arranged for both the vacuum booster section and the hydraulic booster section.

It is a further object of the present invention to provide an improved booster assembly which requires only a common mechanical reaction mechanism for both booster sections.

BRIEF DESCRIPTION OF THE DRAWINGS

Various other objects, features, and attendant advantages of the present invention will be more fully appreciated as the same becomes better understood from the following detailed description when considered in connection with the accompanying drawing wherein:

The sole FIGURE illustrates a cross-sectional view of the brake booster, with the fluid system schematically shown, embodying the present invention.

DETAILED DESCRIPTION OF A PREFERRED EMBODIMENT

Referring now to the drawing, a dual source power brake booster assembly, generally indicated by the reference character 10, includes a differential, air-vacuum pressure operated booster section 11 and a hydraulic pressure operated booster section 12. The vacuum booster section 11 has first and second bodies 13 and 14, which secure the outer periphery of a diaphragm 15 therebetween, whereby a constant vacuum pressure chamber 16 and a variable pressure chamber 17 are defined by bodies 14 and 13, respectively, and diaphragm 15. The chamber 16 receives the vacuum through means of a passage 18 interposed between an intake manifold 19 of a vehicle engine and an inlet port 20, the passage 18 containing a check valve 21 therein, and the chamber 17 is adapted to selectively receive vacuum or atmospheric air, as will be explained more fully hereinafter.

A first power member, or piston 22, to which the diaphragm 15 is secured, has a rightward extension 22a which extends outwardly through the body 13 and is slidable therewithin in conjunction with a sealing member 23 thereof. A push rod 24, which is axially moved by means of a brake pedal, not shown, has a ball end received in a pocket of a valve piston or input member 25 so as to provide a pivoted connection therebetween, the valve piston 25 being slidably mounted within a bore 22b of the power piston 22. A spring 26 has one end seated against a retainer 27 which is held by means of a stepped portion of the inner wall of the extension 22a, and the other end seated against another retainer 28 which abuts a stopped portion of the push rod 24. Therefore, the push rod 24 is biased, by means of the biasing force of the spring 26, to its illustrated released position and the valve piston 25 is biased to its released position due to the pivoted connection with the push rod 24, a stopper 29 extending into a peripheral groove of the valve piston 25 so as to thereby limit the rightward movements of the piston 25 and the push rod 24.

The valve piston 25 has an annular valve end or seat 25a which cooperates with a valve surface 30a of a resilient valve member 30 having a bellows type configuration. The valve member 30 is urged toward the left by means of a spring 31 interposed between the valve member 30 and the retainer 27, so that in the normal or brake release condition, the valve surface 30a is brought into contact with the valve seat 25a. Under these conditions, the valving portion at 30a and 25a interrupts the introduction of atmospheric air into the variable chamber 17 from the space defined between the inner wall of the valve member 30 and the push rod 24. The valve surface 30a of the valve member 30 is also adapted for engagement with a valve end 22c when the valve piston 25 is moved toward the left, the valve end 22c being normally spaced from the surface 30a whereby the variable chamber 17 normally receives the vacuum from the vacuum chamber 16 through means of passages 22d and 22e provided in the power piston 22. This results in the condition that the same pressures are present within both chambers 16 and 17 whereby the power piston 22 and the diaphragm 15 are urged, by means of a return spring 32, into their illustrated positions wherein the diaphragm 15 is brought into contact with the body 13.

The leftward movement of the push rod 24 and the valve piston 25 cause the valve surface 30a to engage the valve end 22c so as to thereby interrupt the fluid communication between chambers 16 and 17, and by means of further movements of such elements, the valve end 25a becomes disengaged from the valve surface 30a thereby introducing atmospheric air into chamber 17.

A reaction mechanism includes a holder 33 which is disposed within a recessed portion 22f of the power piston 22, a plate 34, having a dish configuration, secured to the holder 33, a plurality of reaction levers 35, the outer peripheries of which are supported, through means of a retainer 36, by means of the inside wall of the holder 33, and an output member 37 having an annular or peripheral end which is in contact with the intermediate left surface portions of the levers 35. The left end of the valve piston 25 extends through the levers 35 and into a hole provided within the output member 37, and includes a shoulder 25b which is in contact with the radially innermost portions of the levers 35.

The output member 37 has a stem 37a which is provided with a plurality of axial extending holes 38 which, in turn, receive slidable pins 39 therein, and the stem 37a has a blind bore which receives one end of an output rod 40. One end of the return spring 32 is seated against the plate 34 and the other end thereof is seated against a housing 41 of the hydraulic booster section 12.

The detailed construction of the hydraulic booster section 12 will now be described. The housing 41 sealingly secured to the body 14 of the vacuum booster section 11 has a cylindrical bore 42, the open end of which is closed by means of a plug 43. Slidably disposed within the bore 42 is a second power member or piston 44 which has an enlarged portion 44a which thereby divides the bore 42 into a high pressure chamber 45 and a low pressure chamber 46.

The right end of the small portion 44b of the power piston 44 extends through the plug 43 and into the chamber 16 of the vacuum booster section 11 and plate 34 is secured to the outer periphery thereof. The high pressure chamber 45 is adapted to receive the fluid pressure from a pump 47 through means of a passage 48 and an inlet port 49 provided within the housing 41, respectively, and a conduit 50, while the low pressure chamber 46 is normally connected to a reservoir 51 through means of an outlet port 52 and a conduit 53, a power steering gear 54 being disposed within the conduit 53.

The second power piston 44 includes an axial bore which slidably receives a sleeve member 55 therein which is urged, by means of a spring 56, toward the illustrated position whereby the right end of sleeve 55 is in contact with a shoulder 44c provided upon the inside wall of the power piston 44. The right end of the sleeve 55 is also adapted to engage with pins 39, the lengths of pins 39, however, being less than the distance between the right end of the sleeve 55 and the left end 25c of the valve piston 25, the end 25c provided in the valve piston 25 being normally engaged with the right end of each pin 39 such that the pins 39 are normally loosely fitted within the holes 38.

The other end of the spring 56 is seated against a ring 57 secured to the power piston 44, and an annular groove 55a, provided within the peripheral surface of sleeve 55, is adapted to cooperate with holes 44d and 44e provided within the power piston 44, such elements constituting a valving portion. The hole 44d always opens to the high pressure chamber 45, while the hole 44e always opens to the low pressure chamber 46, and in this manner, the hydraulic communication between both chambers 45 and 46 is controlled by means of the relative movement of the piston 44 and the sleeve 55 constituting the valve portion, an axially extending orifice 58 being formed within the enlarged portion 44a of the power piston 44 so as to allow a small amount of fluid flow into the low pressure chamber 46, whereby the operating fluid for the power steering gear 54 can be assured even when the valving portion, mentioned above, is closed.

A conventional master cylinder 59, only a part of which is shown in the drawing, has a piston 59a which engages the output rod 40 which, in turn, extends within the power piston 44 and the sleeve 55. The leftward movement of the piston 59a, caused by the movement of the rod 40, generates the braking fluid pressures in a conventional manner.

In operation, the parts of the booster assembly illustrated in the drawing are in their non-braking conditions wherein the vacuum is introduced or maintained in the variable chamber 17, and no differential fluid pressure is generated upon both sides of the enlarged portion 44a of the second power piston 44. Therefore, no booster operation is obtained.

When the operator depresses the brake pedal, the leftward movement of the push rod 24 against the biasing force of spring 26 causes the valve piston 25 to move in the same direction. The valve member 30 follows the movement of the valve piston 25 by means of the biasing force of spring 31, while maintaining the contact between the valve seat 25a and valve surface 30a, and the valve surface 30a likewise now engages the valve end 22c of the power piston 22 as a result of the predetermined movement of the valve member 30, whereby the fluid communication between chambers 16 and 17 is interrupted.

When the valve piston 25 is moved further, the valve seat 25a is disengaged from the valve surface 30a since the movement of valve surface 30a is terminated as a result of the contact with valve end 22c. Atmospheric air is therefore introduced into the variable chamber 17 through means of the space defined between the inner wall of the valve member 30 and the push rod 24, and the passage 22e. This generates the differential fluid pressure between the chambers 16 and 17 which displaces the first power piston 22 toward the left against the biasing force of the return spring 32.

Assuming that the depression force on the brake pedal by the operator is constantly maintained at this stage of the braking operation, the valve surface 30a, which is now displaced with the power piston 22, catches up with and is brought into engagement with the valve seat 25a. Immediately after the valve surface 30a engages the valve seat 25a, atmospheric air is still in chamber 17. This causes a slight movement of the power piston 22 toward the left so that the valve end 22c is instantly spaced from the valve surface 30a, as illustrated in the drawing. The fluid communication between both chambers 16 and 17 is thus established so as to decrease the differential fluid pressure therebetween, and thus, the power piston 22 is urged into its original position by means of the biasing force of the spring 32. The valve end 22c is moved so as to again engage the valve surface 30a and biases the same so as to disengage the latter from the valve surface 25a thereby re-increasing the differential fluid pressure between the chambers 16 and 17. Thereafter the differential fluid pressure is cyclically decreased and increased so that the first power piston 22 will be substantially maintained in a position in response to the depression force on the brake pedal by means of the operator.

When the power piston 22 is moved toward the left, as mentioned hereinabove, the outer peripheries of the reaction levers 35 are moved toward the left through means of the holder 33 and the retainer 36. Lever actions will be created due to the engagement between the intermediate portions of the levers 35 and the output member 37, the output member 37 now acting as a fulcrum, and the lower ends or portions of the reaction levers 35 engaged with the shoulder 25b of the valve piston 25 will transmit a predetermined amount of reaction force back to the operator so that the operator can sense the amount of brake booster force. In other words, the levers 35 are moved toward the left through means of the relative movement of the inner and outer ends thereof by means of the power piston 22 and the valve piston 25. As a result, the output member 37 is displaced in the same direction so as to move the output rod 40, and thus, the piston 59a of the master cylinder 59, which is engaged with the output rod 40, generates the braking pressures or forces.

The above-mentioned reaction force back to the operator will be in proportion to the braking forces being generated and will be dependent on a lever ratio of each lever 35. The major portion of the reaction force being generated is transmitted to the first power piston 22 through means of the reaction levers 35 and the holder 33.

During the initial stage of the braking operation, the power piston 22 is moved in accordance with the increasing depression force on the brake pedal so as to follow the movement of the valve piston 25 which is at a position in advance of the power piston 22. This means that the valve seat 25a is spaced from the valve surface 30a, while the valve surface 30a is brought into engagement with the valve end 22c. The first and second power pistons 22 and 44 will move together because of their mutual arrangement with the plate 34, and the pins 39 are arranged so as to still be spaced from the end 25c of the valve piston 25 during the initial braking operation whereby there is no relative movement between the second power piston 44 and the sleeve 55.

Under these conditions, the valving portion at 55a, 44d and 44e of the hydraulic booster section 12 is still maintained to be open whereby the hydraulic pressure from the pump 47 is transmitted to the power steering gear 54 and is then returned to the reservoir 51. If the power steering gear 54 is brought into operation, the hydraulic pressures will be increased within both chambers 45 and 46, however, a differential hydraulic pressure within chambers 45 and 46, which will displace the second power piston 44, will not be generated because the enlarged portion 44a of the second power piston 44 has, at both sides thereof, the same effective areas which are subjected to the hydraulic pressures within chambers 45 and 46, respectively.

When the vacuum booster operation reaches its limit or run-out condition, wherein the atmospheric pressure within the variable chamber 17 of vacuum booster section 11 reaches its maximum value, and greater brake actuating pressures are required, the first power piston 22 cannot bear the additional reaction force which is generated in response to the continuously increasing depression force on the brake pedal, and this causes the relative leftward movement of the valve piston 25 with respect to the power piston 22, whereby the end 25c of the valve piston 25 now engages pins 39 so as to thereby move the sleeve 55 toward the left. The right edge which forms the groove 55a of the sleeve 55 operates to throttle the hole 44d so that the hydraulic pressure is increased within the high pressure chamber 45 thereby generating the differential fluid pressure between chambers 45 and 46.

The second power piston 44 is also moved toward the left by means of the aforenoted differential pressure so as to obtain the hydraulic booster operation, and the force which moves the second power piston 44 toward the left is transmitted to the outer peripheries of the reaction levers 35 through means of the plate 34, the holder 33, and the retainer 36, and thus the outer peripheries of the reaction levers 35 are likewise urged leftwardly. This results in an increase in the biasing force of the output member 37 and also in an increase in the reaction force which is transmitted to the valve piston 25 which, in turn, engages the lower ends of the reaction levers 35. This reaction force will also be in proportion to the braking forces being generated, and consequently, the operator can sense the amount of brake booster force through means of the aforenoted reaction mechanism.

Greater brake actuating pressures will be generated during the second stage of the braking operation wherein the hydraulic booster 12 is operated so as to continue the increase in the master cylinder output pressures. When the master cylinder output pressures attain predetermined values, and the depression force on the brake pedal by means of the operator is constantly maintained, no further movement of the valve piston 25 is caused. This results in the decrease in the force that the valve piston 25 urges or impresses upon the levers 35, and therefore, the relative movement of the second power piston 44, with respect to the sleeve 55 which is operatively associated with the valve piston 25, is caused in the leftward direction such that the valving portion at 44d and 55a is opened.

The differential pressure between chambers 45 and 46 is thus decreased so that the second power piston 44 is slightly returned toward the right by means of the biasing force of the return spring 32 through means of the plate 34, and the valving portion at 44d and 55a is again throttled so as to create the differential pressure between chambers 45 and 46. Thereafter, the valving portion is cyclically controlled and the second power piston 44 is substantially positioned in response to the depression force impressed upon the brake pedal, and thus, the desired master cylinder output pressures will be obtained. The orifice 58 serves to allow a fluid flow to the power steering gear 54 even when the valving portion at 44d and 55a is interrupted during the operation of the hydraulic booster section 12.

When the operator releases the brake pedal, the valve piston 25 is returned by means of the spring 26, and the output rod 40 is likewise returned to its original position under the influence of the residual pressure within the master cylinder 59. The sleeve 55 and pins 39 will be returned together by means of the spring 56, and as a result, the valving portion at 44d and 55a is controlled to be open, this open condition being continued, whereby the second power piston 44 is returned to its original position by means of the return spring 32. As a result of the return movement of the valve piston 25, the valve seat 25a engages the valve surface 30a, and subsequently, the valve surface 30a is spaced from the end 22c of the first power piston 22. The variable chamber 17 now receives the vacuum so that the first power piston 22 is urged to, and maintained at, its original or illustrated position.

If the operator increases the depression force on the brake pedal after the hydraulic booster section 12 reaches its run-out condition, additional manual actuation of the master cylinder may be caused through means of the mechanical connection between the input and output rods 24 and 40 so that the master cylinder pressures will be increased still further.

Assuming that there is no power pressure available to the vacuum booster section 11, the depression force on the brake pedal immediately causes engagement to occur between the valve piston 25 and the pins 39 whereby an immediate operation of the hydraulic booster section 12 will be caused. If there is no power pressure available to the hydraulic booster section 12 due to the failure of the pump 47 or the like, the vacuum booster operation will be assured in substantially the same manner as mentioned hereinabove.

When there is no power pressure available for either booster section, additional depression force on the brake pedal may be manually transmitted through both booster sections, to the master cylinder in order to obtain a manual actuation of the master cylinder. It will thus be apparent that the manual actuation of the master cylinder will be assured even when power pressure is not available to both booster sections.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A brake booster assembly with a master piston reciprocable in a master cylinder, the booster assembly comprising:
    a differential air-vacuum pressure operated booster section including a first power piston, an input member operatively connected with a brake pedal, a first valve means actuated by said input member so as to thereby create a differential fluid pressure which actuates said first power piston, and an output means operatively connected to said first power piston so as to generate a master cylinder output pressure;
    a hydraulic pressure operated booster section including a second power piston, means for mechanically and rigidly connecting said first and second power pistons so as to effect the movement of both of said power pistons as one body at all times, and a second valve means actuated by said input member so as to thereby create a differential hydraulic pressure which actuates said second power piston;
    a delay means for delaying the actuation of said second valve means so as to commence the hydraulic booster operation after said air-vacuum booster section reaches its run-out condition; and
    a common reaction mechanism for both of said booster sections interposed between said first power piston and said input member for causing reaction movement and operation of said output means by said first and second power pistons through said reaction mechanism, said output means including an output rod abutting said master piston and movable relative to both, the first and second power pistons.

2. A brake booster assembly as set forth in claim 1, wherein:
    said reaction mechanism comprises at least one reaction lever having a portion which engages said output means.

3. A brake booster assembly as set forth in claim 1, wherein:
    said reaction mechanism comprises at least one reaction lever, the outer periphery of which is operatively connected with said first power piston and the inner end of which is operatively connected with said input member.

4. A brake booster assembly as set forth in claim 1, wherein:
    said second power piston includes an axial bore defined therein which receives a sleeve member which is, in turn, actuated through said delay means; and
    said second valve means is provided on said second power piston means and said sleeve member and is controlled by the relative movement therebetween.

5. A brake booster assembly as set forth in claim 4, wherein said output means comprises:
    an output member slidably disposed within said axial bore of said second power piston and cooperating with said reaction mechanism; and
    said output rod being disposed within said sleeve member and operatively connected with said output member.

6. A brake booster assembly as set forth in claim 1, wherein:
    said second power piston is arranged so as to define high and low pressure chambers within said hydraulic booster section, said second power piston having the same effective areas which are subjected to hydraulic pressures within said chambers.

7. A brake booster assembly with a master piston reciprocable in a master cylinder, the booster assembly comprising:
    a differential air-vacuum pressure operated booster section including a first power piston, an input member operatively connected with a brake pedal, a first valve means actuated by said input member so as to thereby create a differential fluid pressure which actuates said first power piston, and an output means operatively connected to said first power piston so as to generate a master cylinder output pressure;
    a hydraulic pressure operated booster section including a second power piston, means for mechanically and rigidly connecting said first and second power pistons so as to effect the movement of both of said power pistons as one body at all times, and a sleeve member in said second power piston including a second valve means actuated by said input member so as to thereby create a differential hydraulic pressure which actuates said second power piston;
    a delay means for delaying the actuation of said second valve means so as to commence the hydraulic booster operation after said air-vacuum booster section reaches its run-out condition; and
    a common reaction mechanism for both of said booster sections interposed between said first power piston and said input member for causing reaction movement and operation of said output means by said first and second power pistons through said reaction mechanism, said output means including an output rod abutting said master piston and movable relative to both, the first and second power pistons wherein
    said delay means comprises at least one pin loosely arranged between said input member and said sleeve member.

* * * * *